(12) United States Patent
Furuichi et al.

(10) Patent No.: US 9,898,157 B2
(45) Date of Patent: Feb. 20, 2018

(54) GENERATION OF A FILTER THAT SEPARATES ELEMENTS TO BE DISPLAYED FROM ELEMENTS CONSTITUTING DATA

(71) Applicant: International Business Machines Corporation, Armonk, NY (US)

(72) Inventors: Sanehiro Furuichi, Tokyo (JP); Tomohiro Shioya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/669,732

(22) Filed: Mar. 26, 2015

(65) Prior Publication Data
US 2015/0324959 A1    Nov. 12, 2015

(30) Foreign Application Priority Data

May 8, 2014    (JP) .................................. 2014-096769

(51) Int. Cl.
*G06F 17/21* (2006.01)
*G06F 3/0481* (2013.01)
(Continued)

(52) U.S. Cl.
CPC ........ *G06F 3/0481* (2013.01); *G06F 3/04842* (2013.01); *G06F 9/4443* (2013.01); *G06F 17/211* (2013.01); *G06F 17/30867* (2013.01)

(58) Field of Classification Search
None
See application file for complete search history.

(56) References Cited

U.S. PATENT DOCUMENTS 8,676,795 B1 *   3/2014   Durgin ................ G06F 17/2715
                                                                 707/730
2003/0169908 A1   9/2003   Kim et al.
(Continued)

FOREIGN PATENT DOCUMENTS

JP    H05135203 A    6/1993
JP    2004005456 A    1/2004
(Continued)

OTHER PUBLICATIONS

Partial Translation of Japanese Patent Office Office Action regarding Application No. 2014-096796, dated Mar. 29, 2016, 3 pages.
(Continued)

*Primary Examiner* — Xiao Wu
*Assistant Examiner* — Steven Elbinger
(74) *Attorney, Agent, or Firm* — Christopher M. Coy

(57) ABSTRACT

A technique to improve the efficiency for generating a filter for separating elements to be displayed from elements constituting data. At a client, a content acquisition unit acquires content from a server. A content division unit divides the content into elements. An element display unit randomly displays the elements at positions different from positions at which the elements of the content in an original form are displayed. A selected-element identification unit identifies an element selected by a user from the elements. A filter generation unit generates a filter based on the identified element and saves the filter in a filter saving unit. A filtering unit applies the filter saved in the filter saving unit to the content. A content display unit displays the filtered content.

17 Claims, 12 Drawing Sheets

(51) Int. Cl.
*G06F 3/0484* (2013.01)
*G06F 9/44* (2018.01)
*G06F 17/30* (2006.01)

(56) References Cited

U.S. PATENT DOCUMENTS

| | | |
|---|---|---|
| 2004/0140992 A1 | 7/2004 | Marquering et al. |
| 2009/0150873 A1* | 6/2009 | Taneda ................ G06F 9/45508 717/148 |
| 2010/0250497 A1* | 9/2010 | Redlich ................... F41H 13/00 707/661 |
| 2011/0218985 A1* | 9/2011 | Camper .............. G06F 17/3087 707/707 |
| 2011/0316796 A1* | 12/2011 | Kano .................... G06F 3/0486 345/173 |
| 2011/0320495 A1* | 12/2011 | Levy-Yurista ............ G01S 5/02 707/780 |
| 2012/0115112 A1* | 5/2012 | Purushotma ........... G09B 19/06 434/157 |
| 2013/0254652 A1* | 9/2013 | Chinosornvatana .. G06F 17/211 715/234 |
| 2013/0294755 A1 | 11/2013 | Arme et al. |
| 2014/0214790 A1* | 7/2014 | Vaish ................ G06F 17/30867 707/709 |

FOREIGN PATENT DOCUMENTS

| | | |
|---|---|---|
| JP | 2004178562 A | 6/2004 |
| JP | 2005229194 A | 8/2005 |
| JP | 2006113658 A | 4/2006 |
| JP | 2009064399 A | 3/2009 |
| JP | 2012014293 A | 1/2012 |
| JP | 2014010698 A | 1/2012 |

OTHER PUBLICATIONS

"Word-of-Mouth @ Section Chief, Version-up of Report Output Function !—Strong Support for Work Efficiency of Social Media Analysis—", Hotto Link Co., Ltd., Sep. 12, 2012, 2 pages. (English translation unavailable) http://www.opt.ne.jp/files/topics/870.pdf.

Aoyama, "twicca," Google play, Sep. 26, 2014, 3 pages. https://play.google.com/store/apps/details?id=jp.r246.twicca&hl=ja.

"Twivo, TV Spoiler Blocking Plug-In for Twitter, Invented by Teen Jennie Lamere," Huffington Post, May 8, 2013, 2 pages. http://www.huffingtonpost.com/2013/05/08/twivo-tv-spoiler-blocking-twitter_n_3238664.html.

* cited by examiner

```
           can't    victory              Go
won                          here
         national    lose                  team
                                  national
    goal    for
                              Congratulations
         team
  if         victory      will
```

FIG. 6A

```
         give    victory              Go
   if                         here
         national    lose                  team
                                  national
  goal    for         out
                              next
was       team
            victory      will    Better
```

FIG. 6B

| I'm hungry! I want to eat dinner soon. | ~ 38 |
| The national team has won the victory! Congratulations! | ~ 33 |
| The team will lose if they can't score a goal here. | ~ 32 |
| I'm at the dentist now. | ~ 37 |
| Go for the victory, the national team! | ~ 31 |

However, the team was defeated by a neck, 3 to 6. In the result, the team was unable to win in two successive games. The leader of IBM rugby club had said in an interview before the game, "We trained everyday to win the game. I'm sure that our team will win."

FIG. 12

GENERATION OF A FILTER THAT SEPARATES ELEMENTS TO BE DISPLAYED FROM ELEMENTS CONSTITUTING DATA

CROSS-REFERENCE TO RELATED APPLICATION(S)

This application claims the benefit of priority to Japanese Patent Application No. 2014-096769, filed May 8, 2014, the contents of which are incorporated herein by reference.

TECHNICAL FIELD

The present invention relates to an apparatus and method for generating a filter. In particular, the present invention relates to an apparatus and method for generating a filter for separating elements to be displayed from elements constituting data.

BACKGROUND ART

The advance in internet technology and the widespread use of mobile terminals having internet access in recent years have facilitated access to information. Unfortunately, this also causes a problem of more chances of knowing information that one does not want to know or should not know. For example, one may unintentionally see, in an SNS site, news or conversations about the progress or result of a sports game that he/she is recording for later watching.

As such, techniques have been developed for allowing content on the Internet to be displayed on a mobile terminal while removing information one does not want to know or should not know from the content (for example, see Non-patent Literature 1 and 2).

Non-patent Literature 1 discloses twicca, which is a Twitter® client application for Android®. A filtering function (mute function) is provided in twicca, by which tweets containing set words can be deleted from the timeline.

Non-patent Literature 2 discloses Twivo, which is an extension of Google Chrome®. Twivo functions such that a user enters keywords desired to be blocked, and then tweets containing the keywords are blocked from broadcasts.

CITATION LIST

Non-Patent Literature

[Non-patent Literature 1] twicca, mobile app, available from online Google Play Store, 2014.
[Non-patent Literature 2] Twivo, TV Spoiler Blocking Plug-In For Twitter, Invented By Teen Jennie Lamere, [online], HuffPost TV, May 8, 2013.

SUMMARY OF INVENTION

Technical Problems

As described above, there are known techniques for generating a filter for removing information that one does not want to know or should not know from data such as content. The Non-patent Literature 1 and 2, however, do not disclose means for improving the efficiency of generating such a filter.

An object of the present invention is to improve the efficiency of generating a filter for separating elements to be displayed from elements constituting data.

Solution to Problems

For this purpose, the present invention provides an apparatus for generating a filter for separating elements to be displayed from a plurality of elements constituting data, the apparatus including: a display unit displaying the plurality of elements in a second mode different from a first mode in which the data is displayed in an original form; a reception unit receiving a user operation for selecting a particular element from the plurality of elements; and a generation unit generating the filter based on the particular element.

In the apparatus, the display unit may display the plurality of elements in the second mode in which the meaning of the data understood in the first mode is obscured. In this case, the display unit may display the plurality of elements in the second mode in which the plurality of elements are disposed at positions irrelevant to the positions of the plurality of elements in the first mode, and further may display the plurality of elements excluding part of two or more elements appearing in the data that are the same as or similar to each other.

In addition to the plurality of elements, the display unit may also display an element that obscures the meaning of any of the plurality of elements.

The apparatus may further include a control unit controlling the display unit to highlight another element associated with the particular element, in response to the reception unit receiving the user operation.

Further, in the apparatus, the display unit may display the plurality of elements so that visibility increases over time from the start of displaying the plurality of elements.

The present invention also provides an apparatus for generating a filter for separating elements to be displayed from a plurality of elements constituting content, the apparatus including: an acquisition unit acquiring the content from another apparatus; a division unit dividing the content into the plurality of elements; a display unit randomly displaying the plurality of elements at positions different from positions at which the plurality of elements of the content in an original form are displayed; a reception unit receiving a user operation for selecting a particular element from the plurality of elements; and a generation unit generating the filter based on the particular element.

The present invention further provides a method for generating a filter for separating elements to be displayed from a plurality of elements constituting data, the method including the steps of: displaying the plurality of elements in a second mode different from a first mode in which the data is displayed in an original form; receiving a user operation for selecting a particular element from the plurality of elements; and generating the filter based on the particular element.

The present invention further provides a program for causing a computer to function as an apparatus for generating a filter for separating elements to be displayed from a plurality of elements constituting data, the program causing the computer to function as: a display unit displaying the plurality of elements in a second mode different from a first mode in which the data is displayed in an original form; a reception unit receiving a user operation for selecting a particular element from the plurality of elements; and a generation unit generating the filter based on the particular element.

Advantageous Effect of Invention

The present invention improves the efficiency of generating a filter for separating elements to be displayed from elements constituting data.

BRIEF DESCRIPTION OF DRAWINGS

FIGS. 6A and 6B are diagrams showing exemplary display in which the text contained in the content is divided into elements;

FIG. 7 is a diagram showing exemplary normal display of text contained in content;

FIGS. 11A and 11B are diagrams showing an example in which the elements are displayed to be lighter initially and become darker over time;

FIG. 12 is a diagram showing another exemplary display of the elements; and

DESCRIPTION OF EMBODIMENT

Referring to the appended drawings, an embodiment of the present invention will be described below.
[Configuration of Client-Server System in Embodiment]

Figure 1:
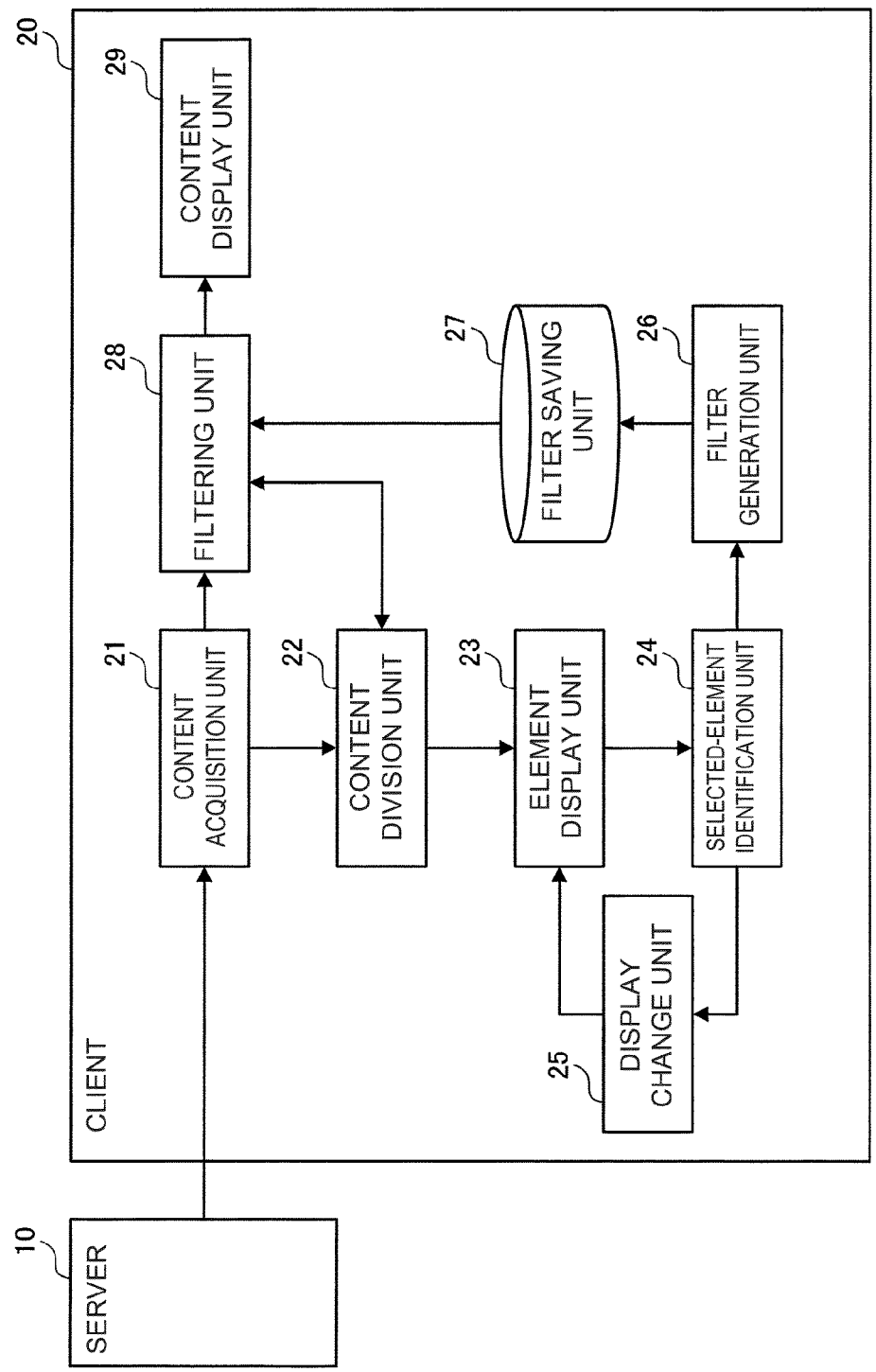
FIG. 1 is a diagram showing an exemplary overall configuration of a client-server system in an embodiment of the present invention.

FIG. 1 is a diagram showing an exemplary overall configuration of a client-server system in this embodiment. As shown, the client-server system includes a server 10 and a client 20.

The server 10 is a computer that maintains content. Here, content refers to user-viewable information, for example web content provided on the Web. Content includes text data, as well as image (still image) data and video data. In this embodiment, the server 10 is provided as an example of another apparatus.

The client 20 is a computer used by a user to view content. In this embodiment, the client 20 also generates a filter for separating elements to be displayed from content. Specifically, as functions operating in the filter generation, the client 20 includes a content acquisition unit 21, a content division unit 22, an element display unit 23, a selected-element identification unit 24, a display change unit 25, a filter generation unit 26, and filter saving unit 27. As functions operating in viewing content by the user, the client 20 includes the filter saving unit 27, a filtering unit 28, and a content display unit 29.

The content acquisition unit 21 acquires content from the server 10. The content acquisition unit 21 then determines whether divided display has been designated at system startup, and whether the current date and time falls within a period (hereinafter referred to as a "divided display period") set in divided display date-and-time setting as a period during which the divided display is applied. If the divided display has been designated at system startup, or if the current date and time falls within the divided display period, the content acquired from the server 10 is passed to the content division unit 22 and the filtering unit 28. If the divided display has not been designated at system startup, and if the current date and time does not fall within the divided display period, the content acquired from the server 10 is passed to the filtering unit 28 but not to the content division unit 22. In this embodiment, the content acquisition unit 21 is provided as an example of an acquisition unit acquiring the content.

The content division unit 22 divides the content received from the content acquisition unit 21 into elements in a dividing manner depending on the type of the content. Any existing method may be used to divide the content. Specifically, if the content is text data, the result of morphological analysis may be used to divide the content. If the content is image data, the result of image analysis may be used to divide the content (for example, along outlines). In dividing the content, changing the dividing granularity by setting allows the amount of information to be adjusted. The content division unit 22 passes the elements resulting from dividing the content to the filtering unit 28, and then receives the filtered elements from the filtering unit 28. In this embodiment, the content division unit 22 is provided as an example of a division unit dividing the content into the plurality of elements.

The elements resulting from dividing the content by the content division unit 22 and filtering by the filtering unit 28 are displayed, according to an element display rule, by the element display unit 23 so that the user can select among the elements. Here, the element display rule is a rule about the position, size, and transparency of displayed elements, and the following four rules may be possible, for example. A first rule is to display the same or similar elements close to each other. A second rule is to display the same or similar elements to overlap each other. This rule, which may be said to display two or more same or similar elements merged into one element, may be more generalized to not displaying part of two or more same or similar elements. In either case, such display can hide the frequency of appearance of the elements. "Similar" in the first and second rules includes not only the similarity in meaning (for example, in the case where the element is a word), but also the similarity in attribute (such as color). Further, a third rule is to vary the position, size, or transparency depending on the frequency of appearance. Still further, a fourth rule is to vary the position, size, or transparency depending on the elapsed display time. This rule may be considered as displaying the elements so that the visibility increases over time from the start of displaying the elements. In this embodiment, the element display unit 23 is provided as an example of a display unit displaying the plurality of elements.

The selected-element identification unit 24 receives a user operation for selecting an element among the elements displayed by the element display unit 23, and identifies the selected element. In this embodiment, the selected-element identification unit 24 is provided as an example of a reception unit receiving a user operation for selecting a particular element.

The display change unit 25 instructs the element display unit 23 to change the display manner for an element (hereinafter referred to as a "related element") related to the element identified by the selected-element identification unit 24. Here, the related element may be an element that is of the same type as or similar to the element identified by the selected-element identification unit 24. The display manner may be changed to highlight the related element (for example, change the display position of the related element to the center, or change the display size or transparency of the related element). In this embodiment, the related element is used as an example of another element associated with the particular element, and the display change unit 25 is provided as an example of a control unit controlling to highlight another element.

The filter generation unit 26 generates or updates a filter based on the element identified by the selected-element identification unit 24. Specifically, the filter is generated or updated by adding the element identified by the selected-element identification unit 24 to the filter saved in the filter saving unit 27. Here, the filter is information for filtering out elements of the content that the user does not want to see or should not see. In this embodiment, the filter generation unit 26 is provided as an example of a generation unit generating a filter.

The filter saving unit 27 saves the filter generated or updated by the filter generation unit 26.

The filtering unit 28 determines whether the current date and time falls within a period (hereinafter referred to as a "filtering period") set in filtering date-and-time setting as a period during which the filter is applied. If the current date and time falls within the filtering period, the filter saved in the filter saving unit 27 is applied to the content received from the content acquisition unit 21 or the elements received from the content division unit 22 to remove an element that the user does not want to see or should not see. The filtering period may be set as hours of a sports game that the user is going to record for later watching, for example.

The content display unit 29 displays the content from which the element that the user does not want to see or should not see has been removed by the filtering unit 28.

[Operation of Client in Embodiment]

Figure 2:
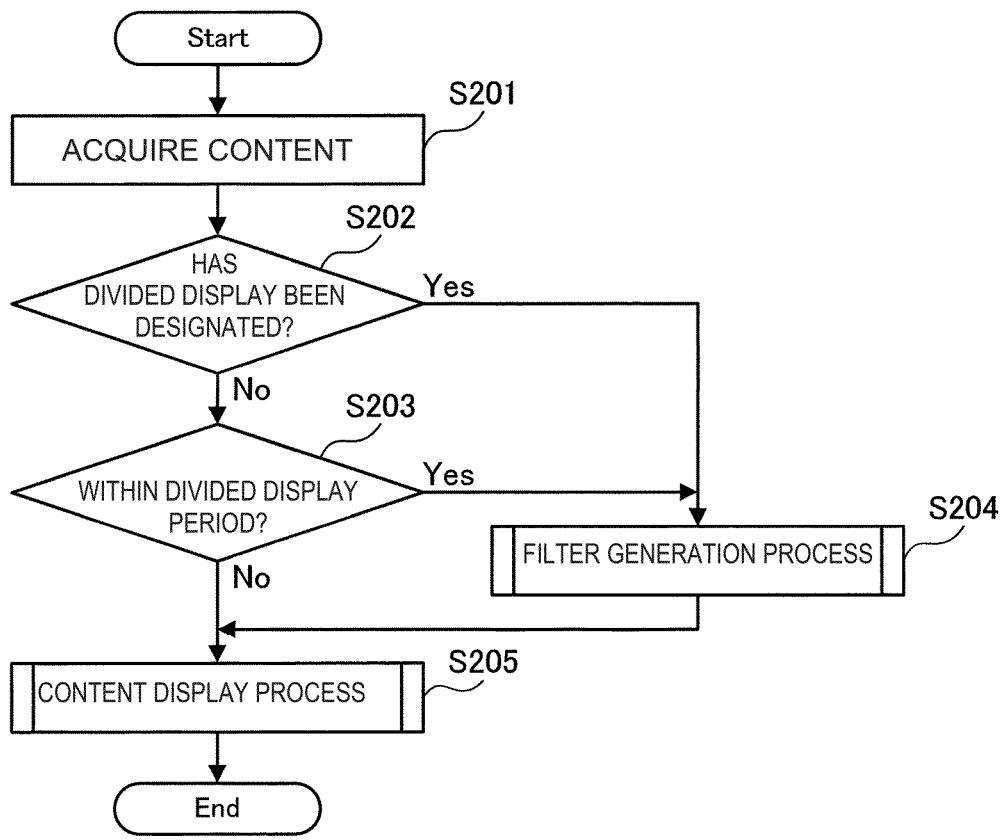
FIG. 2 is a flowchart showing exemplary operation of a client in the embodiment of the present invention.

FIG. 2 is a flowchart showing exemplary operation of the client 20 in this embodiment.

As shown, at the client 20, the content acquisition unit 21 acquires content from the server 10 (step 201). The content acquisition unit 21 then determines whether the divided display has been designated at system startup (step 202). Irrespective of whether the current date and time falls within the divided display period, the user may designate the divided display when he/she thinks he/she might see information that he/she does not want to see or should not see if the system is started. This designation may be done by checking a checkbox in a login screen, for example. Therefore, the content acquisition unit 21 determines whether the divided display has been designated by, for example, seeing whether the checkbox has been checked. If it is determined that the divided display has not been designated, the content acquisition unit 21 determines whether the current date and time falls within the divided display period (step 203).

If it is determined that the divided display has been designated in step 202, or if it is determined that the current date and time falls within the divided display period in step 203, the client 20 executes a filter generation process (step 204) and then a content display process (step 205).

If it is not determined that the divided display has been designated in step 202, and if it is not determined that the current date and time falls within the divided display period in step 203, the client 20 executes the content display process (step 205) without executing the filter generation process.

Figure 3:
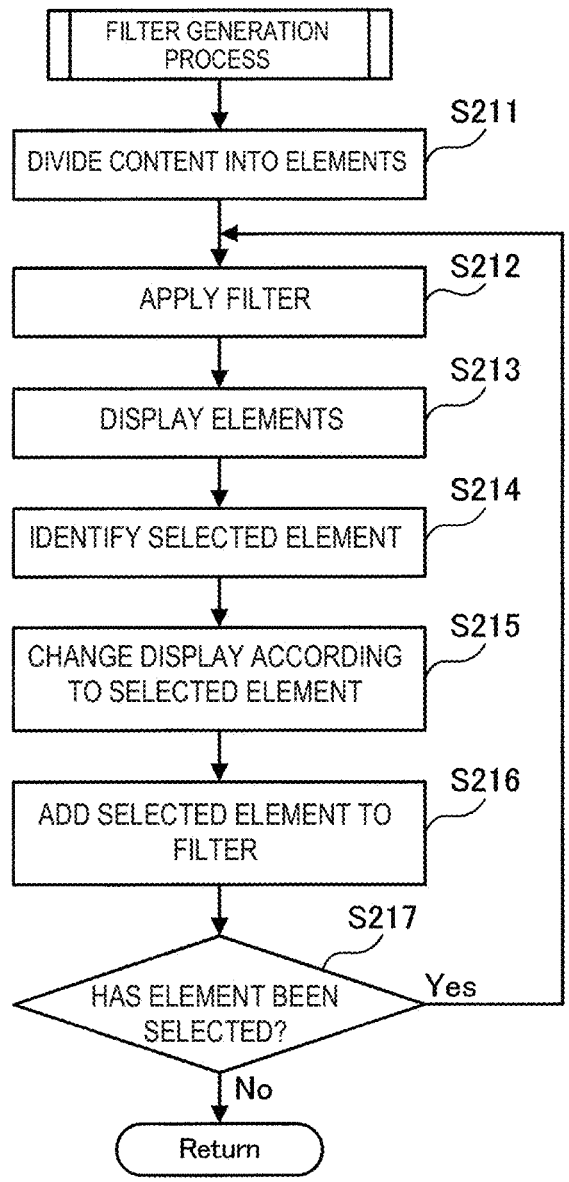
FIG. 3 is a flowchart showing a flow of a filter generation process in the exemplary operation of the client in the embodiment of the present invention.

FIG. 3 is a flowchart showing a flow of the filter generation process in step 204 of FIG. 2.

As shown, the content division unit 22 divides the content acquired in step 201 of FIG. 2 into elements (step 211). The resulting elements are sent to the filtering unit 28, which applies a filter saved in the filter saving unit 27 to the elements (step 212). The filter is applied here in order to hide, when the filter is generated, any element that the user does not want to see or should not see and that is already registered with the filter. As a result of filtering, elements excluding the element that the user does not want to see or should not see are returned to the content division unit 22. Thus, the element display unit 23 displays the elements acquired by the content division unit 22 and subjected to the filter (step 213).

In this state, the user selects an element that the user does not want to see or should not see from the elements, and the selected-element identification unit 24 identifies the selected element (step 214). The display change unit 25 therefore changes the display manner for a related element related to the element identified in step 214 (step 215). The filter generation unit 26 adds the element identified in step 214 to the filter saved in the filter saving unit 27 (step 216).

Thereafter, the selected-element identification unit 24 determines whether the user has selected a next element that the user does not want to see or should not see (step 217). If it is determined that the user has selected an element that the user does not want to see or should not see, the client 20 again executes the processes of steps 212 to 216. The filter is again applied in step 212 in order to hide the element added to the filter in immediately preceding step 216. If it is determined that the user has not selected an element that the user does not want to see or should not see, the client 20 returns the processing to FIG. 2.

Figure 4:
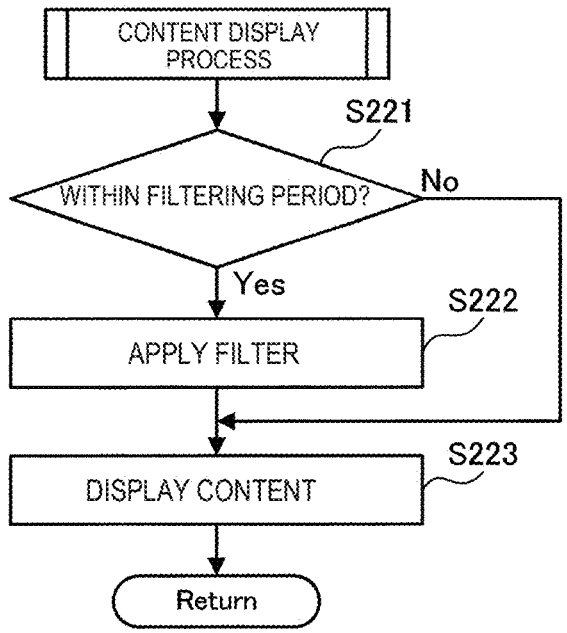
FIG. 4 is a flowchart showing a flow of a content display process in the exemplary operation of the client in the embodiment of the present invention.

FIG. 4 is a flowchart showing a flow of the content display process in step 205 of FIG. 2.

As shown, the filtering unit 28 determines whether the current date and time falls within the filtering period (step 221). If it is determined that the current date and time falls within the filtering period, the filter saved in the filter saving unit 27 is applied to the content acquired in step 201 of FIG. 2 (step 222). The content display unit 29 displays the filtered content (step 223). If it is determined that the current date and time does not fall within the filtering period, the content display unit 29 displays the content acquired in step 201 of FIG. 2 in its original form, i.e., without being filtered (step 223). The client 20 then returns the processing to FIG. 2.

[Specific Example of Displaying Elements]

Dividing the content into the elements in step 211 of FIG. 3 and displaying the elements in step 213 of FIG. 3 will be described in detail.

Figure 5A:
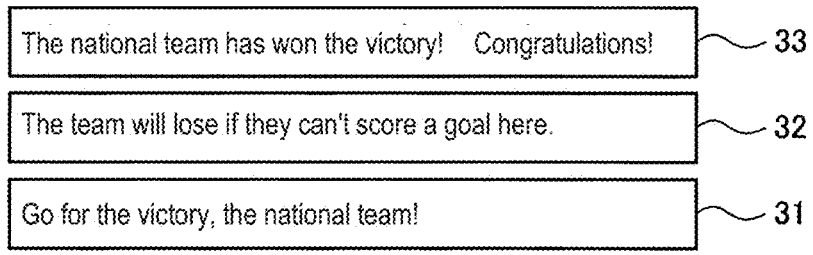
FIGS. 5A and 5B are diagrams showing exemplary normal display of text contained in content.
Figure 5B:
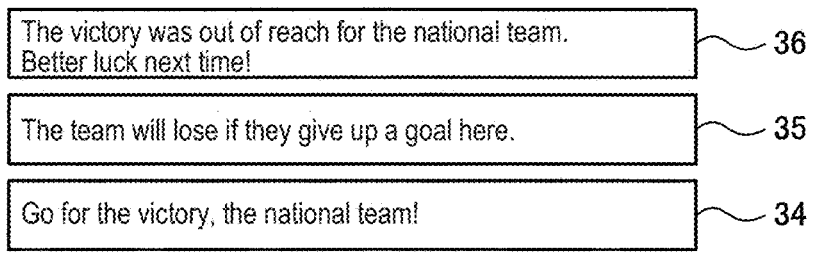

FIGS. 5A and 5B are diagrams showing exemplary normal display of text contained in content used in this description. It is assumed that the user has written text strings 31, 32, and 33 in this order in FIG. 5A, and text strings 34, 35, and 36 in this order in FIG. 5B. While the text strings 31 and 34 are the same, comparison between the text strings 32 and 33 with the text strings 35 and 36 suggests that FIG. 5A shows text strings written when the national team wins, and FIG. 5B shows text strings written when the national team loses. That is, in the exemplary display of FIGS. 5A and 5B, one can know the topic (i.e., a game of the national team is being played) and the details (i.e., the progress and result of the game).

FIGS. 6A and 5B respectively show exemplary display in which the text of FIGS. 5A and 5B is divided into elements. Since FIGS. 6A and 5B both contain words such as "national," "team," "victory," and "lose," one can guess the topic, i.e., that the game of the national team is being played. However, since the words such as "victory" and "lose" are randomly disposed to make their associations incomprehensible, the details, i.e., the progress and result of the game, cannot be known.

[Specific Example of Selecting Elements]

Identifying the selected element in step 214 of FIG. 3, adding the element to the filter in step 216 of FIG. 3, applying the filter in step 222 of FIG. 4, and displaying the content in step 223 of FIG. 4 will be described in detail.

FIG. 7 is a diagram showing exemplary normal display of text contained in content used in this description. The text includes the text strings 31, 32, and 33 of FIG. 5A interspersed with text strings 37 and 38 unrelated to the game of the national team.

Figure 8A:
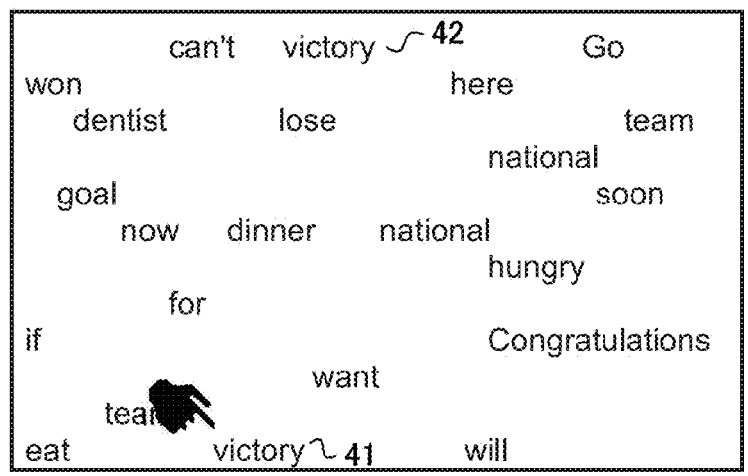
FIGS. 8A, 8B, and 8C are diagrams showing how a user selects elements to be filtered out from elements resulting from dividing the text contained in the content.
Figure 8B:
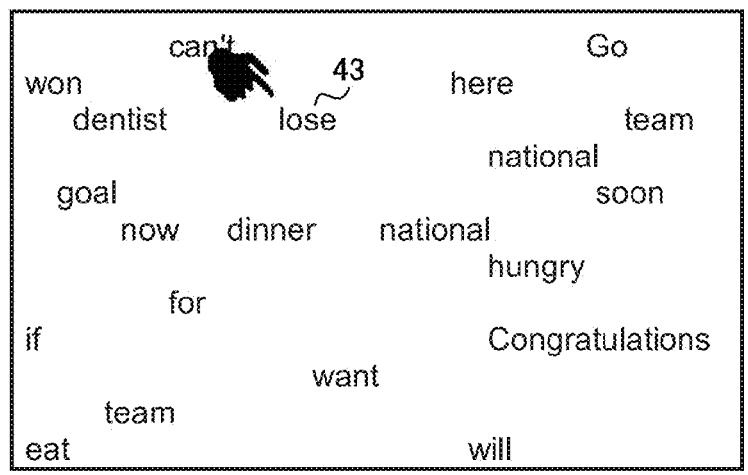
Figure 8C:
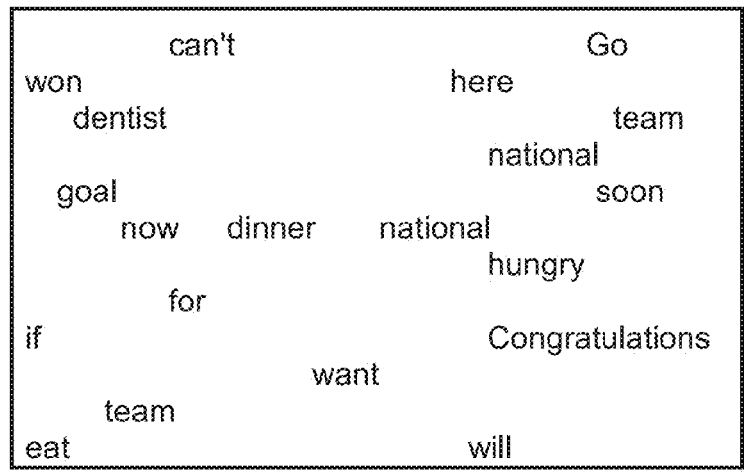

FIGS. 8A, 8B, and 8C are diagrams showing how the user selects elements to be filtered out from elements resulting from dividing the text. Again, as in FIGS. 6A and 6B, the elements are randomly disposed. First, as indicated by a hand cursor in 8A, it is assumed that the user selects an element 41 representing "victory" as an element to be filtered out. Then, as indicated in 8B, the element 41 is hidden. At this point, an element 42 representing the same word "victory" is also hidden. Since this is for the purpose of indicating that the word "victory" is already selected, the word may not be hidden but instead may be displayed in a manner that indicates that the word is already selected. Subsequently, as indicated by the hand cursor in 8B, it is assumed that the user selects an element 43 representing the word "lose" as an element to be filtered out. Then, as indicated in 8C, the element 43 is hidden. Since this is for the purpose of indicating that the word "lose" is already selected, the word may not be hidden but instead may be displayed in a manner that indicates that the word is already selected. Once the "victory" and "lose" are selected as above, a filter that additionally includes these elements is generated.

Figure 9:
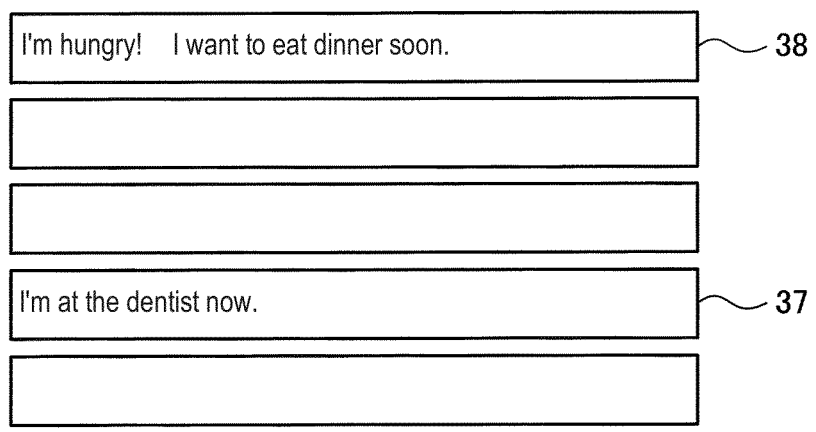
FIG. 9 is a diagram showing an exemplary display in which a generated filter is applied to the text.

FIG. 9 is a diagram showing exemplary display in which the filter generated as above is applied to the text of FIG. 7. Since the text strings 31 and 33 of FIG. 7 contain "victory" and the text string 32 of FIG. 7 contains "lose," all of these text strings are hidden.

[Specific Example of Changing Display Manner Depending on Selected Element]

Changing the display manner for the element in step 215 of FIG. 3 will be described in detail. Here, the description will be given for the case in which the element representing "victory" in FIG. 8A is selected.

Figure 10A:
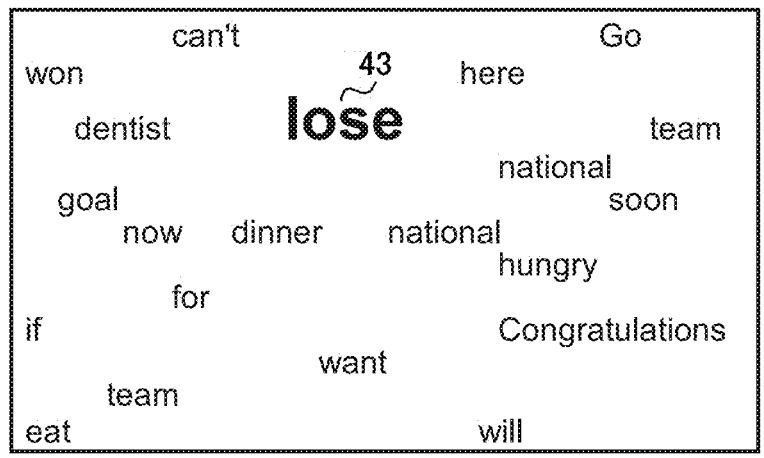
FIG. 10A is a diagram showing an example in which a related element for a selected element is displayed larger and thicker.
Figure 10B:
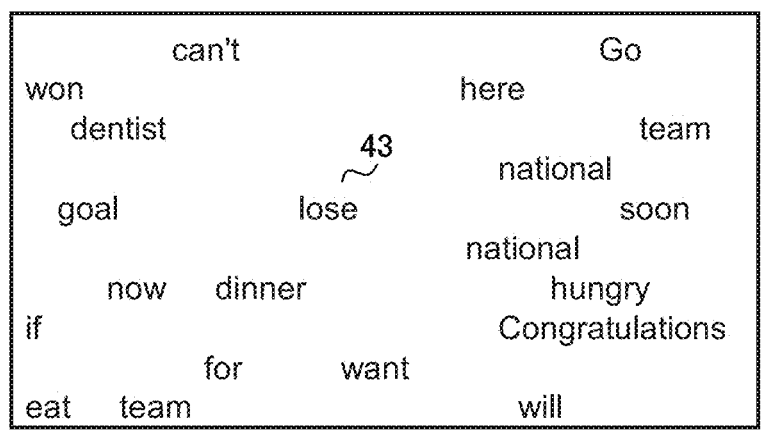
FIG. 10B is a diagram showing an example in which the related element for the selected element is displayed at the center.

FIG. 10A is a diagram showing an example in which a related element for the selected element is displayed larger and thicker. In this example, the element 43 representing "lose," which is the antonym for "victory" represented by the selected element, is displayed larger and thicker. Although the related element is displayed larger and thicker here, the related element may simply be displayed larger. Alternatively, the related element may be displayed with a different transparency. FIG. 10B is a diagram showing an example in which the related element for the selected element is displayed at the center. In this example, the element 43 representing "lose," which is the antonym for "victory" represented by the selected element, is displayed at the center. Although the related element for the selected element is displayed larger and thicker or at the center in the examples of FIGS. 10A and 10B, other display manners may be employed that highlight the related element.

[Additional Specific Example of Displaying Elements]

Displaying the elements in step 213 of FIG. 3 will be further described in detail.

FIGS. 11A and 11B are diagrams showing an example in which the elements are displayed to be light initially and become darker over time. FIG. 11A shows exemplary display just after the start of displaying the elements, while 11B shows exemplary display certain time after the start of displaying the elements. This embodiment involves making the meaning of the content unrecognizable by displaying the content divided into elements. However, it is possible that the elements can be readily recognized and the meaning of the content can be guessed. Therefore, the elements are initially displayed lighter to prevent ready recognition of the entire content. In this manner, the element may be selected for filter generation or update while the meaning of the content is made further unrecognizable.

[Other Specific Examples of Displaying Elements]

The foregoing assumes that the elements are displayed at positions irrelevant to the positions at which the elements of the original content are displayed as it is. However, this is not limitation. The elements may be displayed in any manner that obscures the meaning of the original content understood when displayed as it is. FIG. 12 is a diagram showing such exemplary display. In FIG. 12, while the positions of elements are maintained, the shading, font size, color, font type, and the like are varied to visually confuse the understanding of the meaning of the content. This can be more generalized to displaying the elements in a mode different from the mode in which the original content is displayed as it is.

Further, in this embodiment, the meaning of the content may be made even more unrecognizable by displaying other elements (for example, elements that obscure the meaning of particular elements) in addition to the original elements. For example, in the case of FIG. 12, other elements to be additionally displayed may be "sports" as an abstraction of "rugby," "by a wide margin" as an antonym for "by a neck," and "baseball" as a parallel concept with "rugby." As a result, even though the original content only contains the elements "rugby" and "by a neck," the elements "rugby," "baseball," "sports," "by a neck," and "by a wide margin" are displayed to thereby make the meaning of the content even more unrecognizable. In this case, the number of displayed elements increases. However, decrease in the efficiency of selecting elements to be filtered out is expected to be prevented by facilitating the discovery of the related element for the selected element, as in the example of FIGS. 10A and 10B.

Although this embodiment has been described for the case in which a filter for removing an element of content that the user does not want to see or should not see is generated, the present invention is also applicable to general documents. That is, the user may apply the divided display upon opening a document and determine whether it is a document that the user does not want to see or should not see on the basis of words. The words can then be added to a filter. This can be further generalized to consider the present invention as applicable to data such as documents and images.

As described above, in this embodiment, elements resulting from dividing content are randomly disposed to facilitate input of an element to be registered with the filter. This allows the user to find the element without knowing the detailed meaning of the content, so that the user himself can select the element to be registered with the filter. This also allows the filter to be generated even from content that is hard to categorize. Further, by setting the filtering period, information that the user does not want to know can be blocked for a desired period.

[Hardware Configuration of Client in Embodiment]

Figure 13:
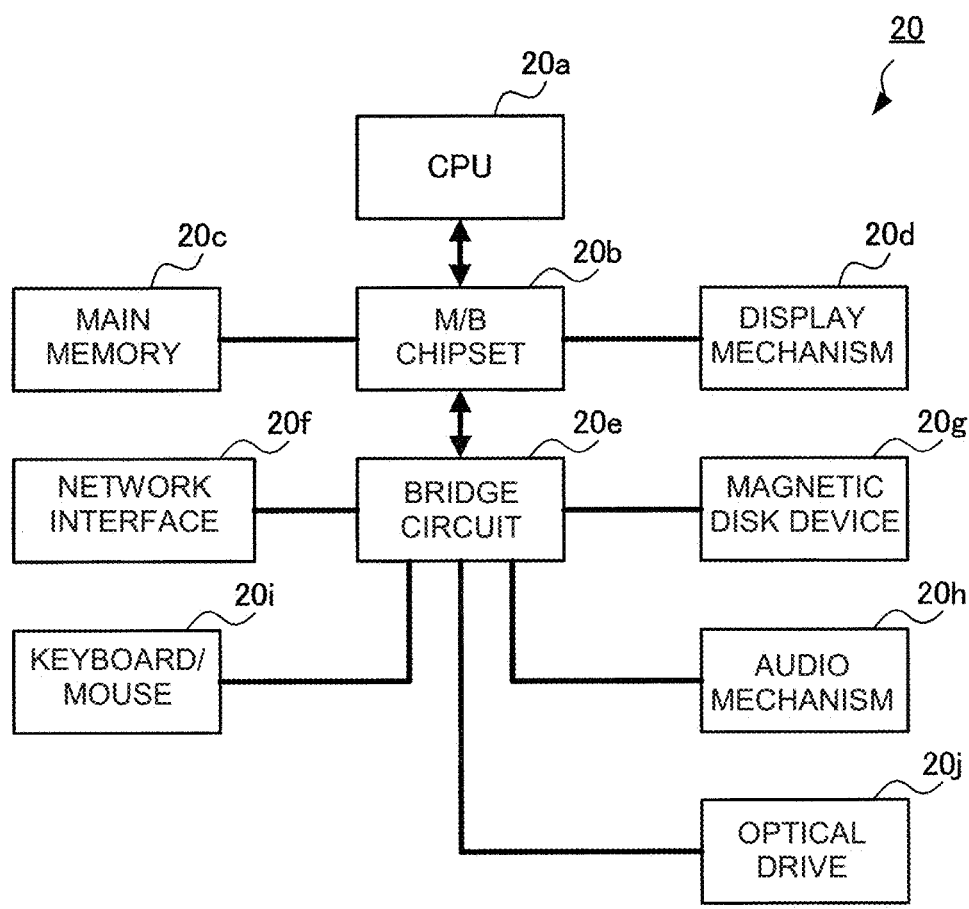
FIG. 13 is a diagram showing an exemplary hardware configuration of the client in an embodiment of the present invention.

FIG. 13 is a diagram showing an exemplary hardware configuration of the client 20 in this embodiment. As shown, the client 20 includes: a CPU (Central Processing Unit) 20a as computing means; a main memory 20c connected to the CPU 20a via an M/B (motherboard) chipset 20b; and a display mechanism 20d also connected to the CPU 20a via the M/B chipset 20b. Connected to the M/B chipset 20b via a bridge circuit 20e are a network interface 20f, a magnetic disk device (HDD) 20g, an audio mechanism 20h, a keyboard/mouse 20i, and an optical drive 20j.

In FIG. 13, the components are connected via buses with each other. For example, connection between the CPU 20a and the M/B chipset 20b, and connection between the M/B chipset 20b and the main memory 20c are implemented via CPU buses. While the M/B chipset 20b and the display mechanism 20d may be connected with AGP (Accelerated Graphics Port), if the display mechanism 20d includes a video card supporting PCI Express, the M/B chipset 20b and the video card is connected via a PCI Express (PCIe) bus. The network interface 20f may be connected to the bridge circuit 20e with PCI Express, for example. The magnetic disk device 20g may be connected to the bridge circuit 20e with serial ATA (AT Attachment), parallel transfer ATA, or PCI (Peripheral Components Interconnect), for example. Further, the keyboard/mouse 20i and the optical drive 20j may be connected to the bridge circuit 20e with USB (Universal Serial Bus), for example.

The present invention may be implemented entirely in hardware, entirely in software, or in a combination of hardware and software. The present invention may be embodied as a computer, a data processing system, or a computer program. The computer program may be stored and distributed in a computer-readable medium. Here, the medium may be an electronic, magnetic, optical, electromagnetic, infrared, or semiconductor system (device or apparatus) or a propagation medium. Examples of the computer-readable medium include a semiconductor, solid-state storage device, magnetic tape, removable computer diskette, random access memory (RAM), read only memory (ROM), rigid magnetic disk, and optical disk. Examples of the optical disk at present include a compact disc read only memory (CD-ROM), compact disc read/write (CD-R/W), and DVD.

Although the present invention has been described above with reference to its embodiment, the technical scope of the present invention is not limited to the above embodiment. It is apparent to those skilled in the art that various modifications and replacements may be made without departing from the spirit and scope of the present invention.

REFERENCE SIGNS LIST

10 . . . server
20 . . . client
21 . . . content acquisition unit
22 . . . content division unit
23 . . . element display unit
24 . . . selected-element identification unit
25 . . . display change unit
26 . . . filter generation unit
27 . . . filter saving unit
28 . . . filtering unit
29 . . . content display unit

What is claimed:

1. An apparatus configured to generate a filter configured to separate text elements to be displayed from a plurality of text elements constituting data, the apparatus comprising:
   a memory, and
   a processor connected to the memory, wherein the processor is configured to perform a method, the method comprising:
   identifying a filtering period, the filtering period being a period of time in which a filter is applied;
   determining whether a current date and time fall within the filtering period;
   displaying the plurality of text elements in a second mode different from a first mode in which the data is displayed in an original form in response to determining the current date and time fall within the filtering period, wherein displaying the plurality of text elements in the second mode includes rearranging the position of the text elements such that the meaning of the data understood in the first mode is obscured;
   receiving, after the displaying the plurality of text elements in the second mode and from a user, a user operation for selecting a particular text element from the plurality of text elements; and
   generating the filter based on the particular text element selected by the user.

2. The apparatus according to claim 1 wherein displaying the plurality of text elements in the second mode includes displaying the plurality of text elements in which the plurality of text elements are disposed at positions that are random with respect to positions of the plurality of text elements in the first mode.

3. The apparatus according to claim 2, wherein displaying the plurality of text elements includes removing two or more text elements appearing in the data that are related to each other, and wherein the two or more text elements are related if the text elements are synonyms or antonyms.

4. The apparatus according to claim 1, the method further comprising:
   displaying, in addition to the plurality of text elements, an element that obscures a meaning of any of the plurality of text elements.

5. The apparatus according to claim 1 the method further comprising:
   controlling the display unit to highlight another text element associated with the particular text element in response to a reception unit receiving the user operation.

6. The apparatus according to claim 1, the method further comprising:
   displaying the plurality of text elements so that visibility increases over time from the start of displaying the plurality of text elements.

7. The apparatus of claim 1, wherein a filtering period may be predetermined by a user selecting a particular date and time.

8. The apparatus of claim 1, wherein the filter based on the particular text elements selected by the user may be saved in a filter saving unit.

9. The apparatus of claim 8, wherein the generating the filter based on the particular text element further comprises:
checking the filter saving unit for saved text elements related to the particular user selected text elements in response to receiving the user operation for selecting the particular text element from the plurality of text elements, wherein text elements are related if the text elements are synonyms or antonyms; and
identifying saved text elements in the filter saving unit related to the particular user selected text elements.

10. A method for generating a filter configured to separate text elements to be displayed from a plurality of text elements constituting data, the method comprising the steps of:
identifying a filtering period, the filtering period being a period of time in which a filter is applied;
determining whether a current date and time fall within the filtering period;
displaying the plurality of text elements in a second mode different from a first mode in which the data is displayed in an original form in response to determining the current date and time fall within the filtering period, wherein displaying the plurality of text elements in the second mode includes rearranging the position of the text elements such that the meaning of the data understood in the first mode is obscured;
receiving a user operation for selecting a particular text element from the plurality of text elements; and
generating the filter based on the particular text element.

11. The method of claim 10, wherein the filter based on the particular text elements selected by the user may be saved in a filter saving unit.

12. The method of claim 11, wherein the generating the filter based on the particular text element further comprises:
checking, the filter saving unit, for saved text elements related to the particular user selected text elements in response to receiving the user operation for selecting the particular text element from the plurality of text elements; and
identifying saved text elements in the filter saving unit related to the particular user selected text elements.

13. The method of claim 10, wherein the generating the filter based on the particular text element further comprises:
determining antonyms for the selected particular text element; and
replacing the selected particular text element with the determined antonyms.

14. The method of claim 10, wherein the determined antonym is displayed larger and thicker than the selected particular text element and is placed in the center, and wherein the displaying further follows display rules, the display rules comprising:
display same or similar text elements close to each other;
display some of the same or similar text elements so that they overlap each other and so two of the same or similar text elements are merged into a single text element;
display the plurality of text elements so that they vary position, size, or transparency, depending on the frequency of appearance of each text element; and
display the plurality of text elements so that the visibility of each text element the increases over time.

15. The method of claim 10, wherein the identifying occurs in response to a system startup, and wherein the generating the filter based on the particular text element further comprises:
determining an abstraction that includes one or more text elements for the selected particular text element; and
replacing the selected text element with the determined abstracted one or more text elements.

16. A program product for causing a computer to generate a filter for separating text elements to be displayed from a plurality of text elements constituting data, the program product comprising instructions embodied on a non-transitory computer-readable storage medium, wherein the instructions are configured to cause the computer to perform steps of:
identifying a filtering period, the filtering period being a period of time in which a filter is applied;
determining whether a current date and time fall within the filtering period;
displaying the plurality of text elements in a second mode different from a first mode in which the data is displayed in an original form in response determining the current date and time fall within the filtering period, wherein displaying the plurality of text elements in the second mode includes rearranging the position of the text elements such that the meaning of the data understood in the first mode is obscured;
receiving a user operation for selecting a particular text element from the plurality of text elements; and
generating the filter based on the particular text element.

17. A computer implemented method comprising:
receiving an original document data set including information indicative of a human understandable piece of natural language text including a plurality of text elements and an ordering of the plurality text elements relative to each other, with each text element including a word or phrase, and with the ordering being indicative of a manner in which the text elements should be positioned relative to each other so that the piece of natural language text conveys meaningful message(s);
generating, by machine logic, a jumbled document data set including at least a substantial portion of the plurality of text elements and position information indicating a relative positioning of the at least a substantial portion of the text elements, with the relative positioning being a jumbled relative positioning that jumbles at least a portion of the plurality of text elements such that when the at least a substantial portion of text elements is displayed according to the relative positioning the at least a substantial portion of text elements does not convey any meaningful message(s);
displaying, on a computer display device and to a user, a jumbled document display corresponding to the jumbled document data set and its jumbled relative positioning;
receiving, from the user, user input selecting a selected text element of the at least a substantial portion of text elements displayed in the jumbled document display;
generating, by machine logic, a filtered document data set that includes only a filtered subset of text elements of the plurality of text elements, with the filtered subset being filtered by including only text elements of the plurality of text elements that do not include the selected text element and are not in a predetermined proximity to the selected text element based on the ordering of the original document data set, wherein the filtered document data set is generated based on the received input from the user; and displaying, on the display device and to the user, the filtered document data set according to the ordering of the original document data set.

\* \* \* \* \*